United States Patent [19]

Fennema

[11] Patent Number: 5,142,516
[45] Date of Patent: Aug. 25, 1992

[54] ANTI-SKATING CONTROL OF A POSITIONING SERVO SYSTEM

[75] Inventor: Alan A. Fennema, Tucson, Ariz.

[73] Assignee: International Business Machines Corporation, Armonk, N.Y.

[21] Appl. No.: 589,709

[22] Filed: Sep. 28, 1990

[51] Int. Cl.⁵ .......................... G11B 7/00; G11B 17/22
[52] U.S. Cl. ................................ 369/44.28; 369/32; 369/44.32
[58] Field of Search ............... 369/44.32, 44.28, 44.29, 369/44.25, 32, 54, 44.35

[56] References Cited

U.S. PATENT DOCUMENTS 4,730,290 3/1988 Takasago et al. ................ 369/44.25
4,914,725 4/1990 Belser et al. ..................... 360/77.06

FOREIGN PATENT DOCUMENTS 0362987 7/1989 European Pat. Off. .
0388519 11/1989 European Pat. Off. .
0378182 1/1990 European Pat. Off. .

*Primary Examiner*—Roy N. Envall, Jr.
*Assistant Examiner*—Nabil Hindi

[57] ABSTRACT

A servo positioning system, such as used in an optical disk or other types of disk drives includes focus and positioning servo circuits. When a focus error is detected, then it is desired to stop the operation of the positioning system. Similarly, when a positioning error is detected, such as excessive speed or a non-zero velocity at the end of a seek or positioning motion, the head carriage should also be stopped. The stopping of the head carriage is by dynamic braking through use of a power amplifier which is switched from a transconductance mode used during normal servo positioning operations to a voltage amplifying mode which is set to a zero input for dynamically braking the servo positioning system to a safe speed and thence to a stop condition whereupon further error recovery procedures may be employed.

15 Claims, 1 Drawing Sheet

ANTI-SKATING CONTROL OF A POSITIONING SERVO SYSTEM

FIELD OF THE INVENTION

The present invention relates to servo positioning systems particularly those usable in disk drives.

BACKGROUND OF THE INVENTION

When certain sensing systems in a servo positioning system do not provide appropriate signals, then a servo positioning system can operate out of control resulting in undesired speed of operation and movement to an emergency stop. In optical disk recorders, such loss of sensing control includes a loss of focus which removes track position information enabling a head carriage or coarse actuator to actuate an undesired motion at high speeds resulting in hitting an emergency mechanical stop in the drive. Even with some focus controls operating satisfactorily a servo positioning control circuit may not stop at a target track, i.e., the velocity or speed of the carriage is greater than zero at the end of a seek operation. Also, when a velocity of the head carriage exceeds a predetermined threshold an uncontrolled or undesired motion is indicated. When any of the three above-described conditions occur, it is desired to control or limit the operation of the head carriage for preventing damage to the optical drive.

DISCUSSION OF THE PRIOR ART

Co-pending commonly assigned application for patent Ser. No. 07/538,049 W. W. Chow, et al, now U.S. Pat. No. 5,046,060, shows a so-called anti-skating circuit which operates with a track following loop. A tracking error signal (TES) is supplied to anti-skate circuits. In the track following mode, the anti-skate circuits detect any unintended radial motion of the head. The anti-skate circuits then take action to break or stop the head whereupon track following re-ensues after a seek to the previous track. In the stopping operation, the connection of the TES to the servo control circuits is interrupted and a voltage clamp is applied to the positioning circuits for immediately stopping the coarse actuator or head carriage. Such clamping operation is provided by sets of diodes which may include a Zener diode for setting a threshold. The clamping operation is applied to the fine actuator which then stops the coarse actuator because the coarse actuator always follows the motion of the fine actuator.

SUMMARY OF THE INVENTION

In accordance with the present invention, a power amplifier circuit which powers the actuator for a servo positioning system includes a transconductance mode effective during servo positioning actions. That is, the output current is dependent upon the input voltage. Upon detecting an out-of-focus condition, an undesired speed of the servo positioning system or a non-zero velocity at an intended end of a seek or positioning motion, the operation of the power or driver amplifier is switched from a transconductance mode to a voltage amplification mode and the input to the power amplifier is made equal to zero. This arrangement dynamically breaks the servo positioning systems for forcing the servo positioning members to come to a relatively quick stop.

The foregoing and other objects, features and advantages of the invention will be apparent from the following more particular description of preferred embodiments of the invention, as illustrated in the accompanying drawings.

DETAILED DESCRIPTION OF THE DRAWINGS

Figure 1:
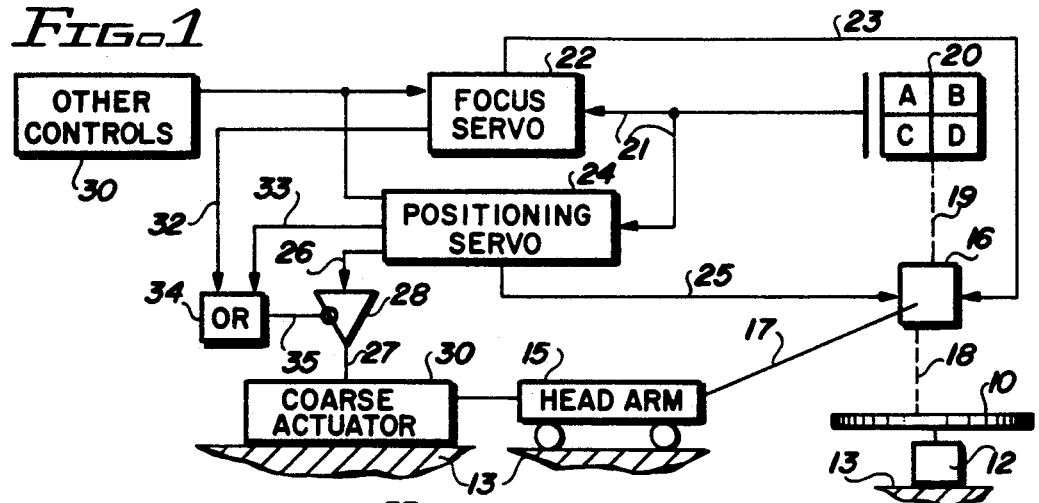
FIG. 1 is a simplified block-diagram showing the operation of the present invention in an optical disk environment.

Referring now more particularly to the drawing, like numerals indicate like parts and structural features in the figures. Optical disk 10 is mounted for rotation on a motor 12 which in turn is secured to a frame 13 of the optical disk drive. Headarm or carriage 15 is movably mounted on frame 13 for radial motions with respect to disk 10. The fine actuator 16, which includes an objective lens (not shown), is mounted for relative motion on head carriage 15 as indicated by line 17. The optical beam is suitably supplied by an optical means (not shown), such as shown in U.S. Pat. No. 4,914,725, to fine actuator 16 which directs the beam over path 18 to disk 10. Disk 10 reflects the light back over path 18 to fine actuator 16. Optics (not shown) such as beam splitters, as is well known, direct a portion of the reflected light from disk 10 over path 19 to quad detector 20. Quad detector 20 has four electrically independent photosensors A, B, C, and D. The output signals from the photosensors A-D are supplied independently over cable 21 to focus servo circuits 22 and positioning servo circuits 24. In the servo circuits 22, 24 logic circuits (not shown), in a known manner, convert the four signals from sensors A-D into a focus error signal and into a tracking error signal (TES). Focus servo 22 responds to the focus error signal to supply a focusing drive signal over line 23 to fine actuator 16 which causes motion axially of the disk 10, as is known. In a similar manner, positioning servo circuit 24 responds to the tracking error signal (TES) generated by its logic circuit to provide a positioning signal over line 25 to fine actuator 16 or radial motions with respect to disk 10. Positioning servo circuit 24 also includes circuits for controlling the head carriage 15 via coarse actuator 30. The arrangement is such that the radial position of head carriage 15 always follows the radial motion of fine actuator 16. This arrangement is well known. Whenever fine actuator 16 is radially displaced from a reference position on the head carriage 15, positioning servo circuits 24 supply an actuating drive signal over line 26 through power amplifier 28 thence over line 27 to a coarse actuator coil 30. Coil 30 is operatively connected to the head carriage 15 for effecting the desired radial motions. When the fine actuator 16 is positioned at the desired reference position on head carriage 15, then the fine actuator is directing a laser beam to a center of a track (not shown) of disk 10.

In accordance with the invention, power amplifier 28 is switchable between a transconductance amplifying mode which is used during normal positioning operations and a voltage amplifying mode which is used in a dynamic braking mode for stopping the head carriage 15 from moving too far radially either inwardly or outwardly towards either one of two mechanical stops (not shown). When focus servo circuits 22 detect an out of focus or an undesired focus condition, then a signal is supplied over line 32 through OR circuit 34, thence over line 35 to actuate amplifier 28 to switch from the transconductance mode to the voltage amplifying mode, as later explained with respect to FIG. 2. In a similar manner, positioning servo circuits 24 include undesired velocity detection circuits which emit a signal over line 33 when an undesired velocity or speed is detected. The signal on line 33 passes through OR circuit 34 to amplifier 28 as described for the undesired focus circuit signal indicating. When amplifier 28 is in the voltage amplifying mode, it dynamically brakes coarse actuator 30, as will be explained later with respect to FIG. 2. The operation of the FIG. 1 illustrated circuits is under control of other controls 30 in particular the focus and servo positioning controls are effected by signals supplied by other controls 30 over a cable 31.

Figure 2:
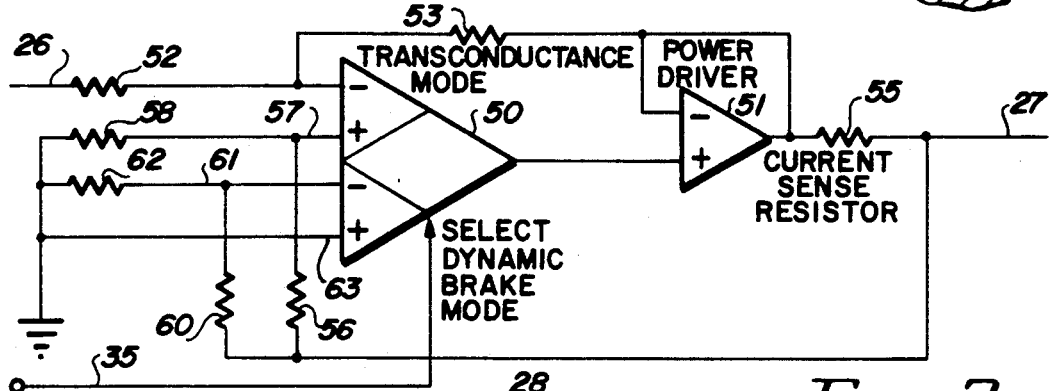
FIG. 2 is a simplified schematic diagram of a power amplifier which is switchable between a transconductance mode and a voltage control mode such as usable in the FIG. 1 illustrated system.

FIG. 2 illustrates the internal construction of amplifier 28 in a simplified manner. The switchable amplifier 50 is switchable between a transconductance mode and a voltage amplifying mode. Amplifier 50 supplies its output signals to one input of a power driver amplifier 51 which in turn supplies the coarse actuator signal to current sensor resistor 55 over line 27. The output signal of power driver amplifier 51 is supplied through resistor 53 to one input to amplifier 50 for operation during the transconductance mode. The position error signal on line 26 is supplied through resistor 52 to the first input of the amplifier 50. This signal actuates the coarse actuator 30 through the amplifiers 50 and 51. A feedback signal supplied from line 27 through resistor 56 to a node 57 as a second input to amplifier 15 in the transconductance mode, resistor 58 connects node 57 to a ground reference potential. A signal received over line 35 switches the operation of amplifier 50 from the transconductance mode to the voltage amplifying mode. At this time, the input on line 26 and line 27 through node 57 are disconnected from the output. As a substitute, a input at line 63 connected to ground reference potential provides a zero voltage reference input for causing the amplifier 50 to output a zero output level indicator signal which effects the dynamic braking of coarse actuator 30. A second input in the voltage amplifier mode is received from line 27 through resistor 60 to node 61. Node 61 in turn is connected to ground reference potential through resistor 62. In the voltage amplification mode, amplifier 50 causes the power amplifier 51 to act as a current sink which keeps the voltage across the coil (not shown) of coarse actuator 30 at zero. This action dynamically brakes headarm or carriage 15. Power driver amplifier 51 is preferably a unity gain power driver stage. Amplifiers 50 and 51 cooperate to form a transconductance amplifier in the servoing mode, i.e., the voltage input controls the output current. In the voltage amplifier mode, the two amplifiers 50 and 51 cooperate to provide the above-described dynamic braking.

Figure 3:
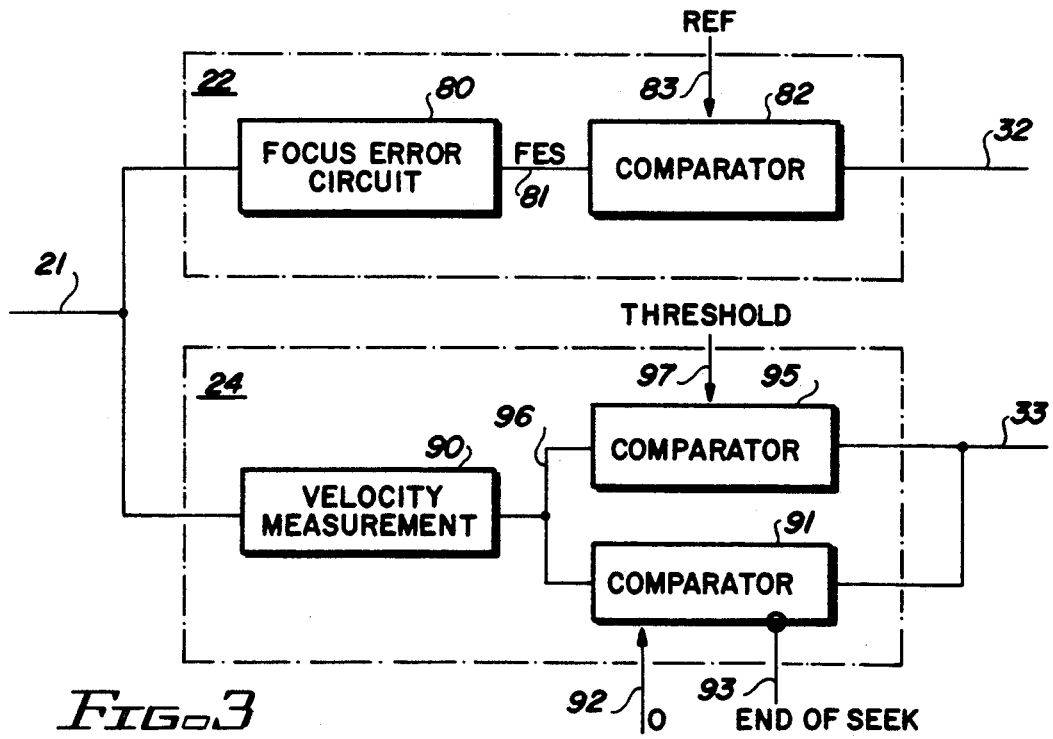
FIG. 3 is a simplified block diagram of threshold detectors for actuating the switching of the FIG. 2 illustrated amplifier.

FIG. 3 illustrates in simplified form sensing conditions which trigger the voltage braking operation of the amplifier 28. For the focus error detection of circuit 22, the signals from quad detector 20 over line 21 flow to focus error circuit 80. Focus error circuit 80, in a known manner, combines the signals to provide a focus error signal (FES) on line 81. Normally, the FES signal on line 81 is used to generate a focus error correcting signal on line 23. That circuit is not shown. For detecting an out of focus condition, comparator 82 compares the line 81 FES signal with a reference value received over line 83. Reference value on line 83 indicates a undesired out of focus condition which could cause the coarse actuator 30 to power the head carriage 15 in an undesired manner because of lack of track crossing information detected by quad detector 20 and supplied over cable 21 to positioning servo 24. Accordingly, comparator 82 then supplies an actuating signal over line 32 to actuate amplifier 28 to the dynamic braking mode.

In a similar manner, positioning servo circuits 24 include a velocity measurement circuit 90 which generates a velocity indicating signal supplied over line 96 and which is used in controlling the fine actuator 16. This well known operation is not shown or described. In accordance with the invention, a comparator 91 received the velocity signal from line 96 for comparing same with a zero velocity signal received over line 92. An end of seek signal from other controls 30 received over line 93 enables the comparator 91 to compare the current velocity as indicated on line 96 with a desired zero velocity. If the current velocity at the end of the seek is non-zero, then an error has occurred in the seeking operation. As a result, dynamic braking should ensue, therefore, comparator 91 supplies an actuating signal over line 33 to switch the amplifier 28 to the dynamic braking mode. A velocity imparted to the coarse or head carriage 15 may unintentionally increase beyond a predetermined safe limit. Accordingly, comparator 95 compares the current velocity signal on line 96 with a maximum speed threshold signal received over line 97. Whenever the signal amplitude on line 96 exceeds the threshold signal on line 97, then comparator 95 supplies an actuating signal over line 33 as above described.

While the invention has been particularly shown and described with reference to preferred embodiments thereof, it will be understood by those skilled in the art that various changes in form and details may be made therein without departing from the spirit and scope of the invention:

What is claimed is:

1. In apparatus for operating an optical disk drive having an objective lens moveable along its axis for focussing and transversely to the optical axis for seeking and track following motions, an optical disk in optical communication with the lens for receiving a light beam therefrom and for reflecting the received light beam to the lens, optical processing means in optical communication with the lens for supplying a light beam to the lens for transmission to the optical disk and receiving the reflected light beam from the lens, a focus servo means receiving a part of the reflected light from the optical processing means for generating an focus error signal and for generating a focus drive signal to move the lens along its optical axis for focusing same, a seeking and tracking servo means receiving a part of the reflected light from the optical processing means for generating a tracking error signal TES for generating a tracking and seeking control signal, actuator means supporting the lens for said movement and connected to the focus servo means and to the seeking and tracking servo means for being actuated thereby for moving the lens in radial motions with respect to the optical disk, including, in combination:

threshold means supplying a threshold signal that indicates a predetermined undesired servo error value;

excessive error means in one of the servo means and being connected to the threshold means for receiving the threshold signal for comparing the threshold signal with the error signal in the one servo means for supplying a first control signal when the one servo means error signal exceeds the threshold signal;

output amplifier means electrically interposed between the actuator means and said seeking and tracking servo means and the output amplifier means having an input connection for receiving said tracking and seeking control signal and having an output connection for supplying an actuating drive signal to said actuating means; and stop means in the seeking and tracking servo means connected to the excessive error means having a stopping connection to said output amplifier means and for responding to the first control signal to actuate the output amplifier means to isolate the seeking and tracking servo means from the objective lens and to actuate the output amplifier means to stop the seeking and tracking motions of the objective lens.

2. In the apparatus set forth in claim 1 further including, in combination:

said excessive error means including error means in the focus servo means for detecting a focus error signal having a servo error value exceeding said threshold signal indicated predetermined undesired servo error value.

3. In the apparatus set forth in claim 1 further including, in combination:

said seeking and tracking servo means including velocity means for detecting a current radial velocity of the lens in said seeking and tracking motions and supplying a velocity signal indicative of the magnitude of the radial velocity of the lens;

said excessive error means including error means in the seeking and tracking servo means for comparing the velocity signal indicated radial velocity with the threshold signal indicated predetermined undesired servo error value and for generating said first control signal when the velocity signal indicated radial velocity is greater than the threshold signal indicated predetermined undesired servo error value.

4. In the apparatus set forth in claim 3 further including, in combination:

means in the seeking and tracking servo means for indicating end of a seek operation;

means in the threshold means for supplying an end-of-seek velocity threshold signal; and said excessive error means having means responsive to said end of seek indication to compare said velocity signal with said end-of-seek velocity threshold signal for supplying said first control signal when the velocity signal exceeds said end-of-seek velocity threshold signal.

5. In the apparatus set forth in claim 1 further including, in combination:

said output amplifier means having switchable-amplifier means for operating in a transconductance mode to supply said actuating drive signal for actuating said actuator means for effecting said seeking and tracking motions of the lens, said switchable-amplifier means being switchable to a voltage amplifying mode; and voltage feedback means in the output amplifier means connected to said output connection of the output amplifier means and to said switchable-amplifier means for feeding back a voltage signal from said output connection to said switchable-amplifier means for limiting its output signal to a predetermined small magnitude for dynamically braking said actuator means for stopping the lens radial motion.

6. In the apparatus set forth in claim 1 further including, in combination:

said actuator means having a head carriage relatively movable with respect to the disk in a radial direction of the disk and a fine actuator relatively movably mounted on the head carriage for movement in said radial direction with respect to the disk and to the head carriage, said fine actuator carrying the objective lens for said focussing and seeking motions; and said stop means being connected to the head carriage for stopping the head carriage.

7. In the apparatus set forth in claim 6 further including, in combination:

said excessive error means including error means in the focus servo means for detecting a focus error signal exceeding said threshold.

8. In the apparatus set forth in claim 6 further including, in combination:

said seeking and tracking servo means including velocity means for detecting a current radial velocity of the lens in said seeking and tracking motions and supplying a velocity signal indicative of the magnitude of the velocity;

said excessive error means including error means in the seeking and tracking servo means for comparing the velocity signal with the threshold and for generating said first control signal when the velocity signal is greater than the threshold.

9. In the apparatus set forth in claim 8 further including, in combination:

means in the seeking and tracking servo means for indicating end of a seek operation;

means in the threshold means for supplying an end-of-seek velocity threshold signal; and said excessive error means having means responsive to said end of seek indication to compare said velocity signal with said end-of-seek velocity threshold signal for supplying said first control signal when the velocity signal exceeds said end-of-seek velocity threshold signal.

10. In the apparatus set forth in claim 6 further including, in combination:

said output amplifier means connected to the head carriage of said actuator means and having switchable-amplifier means for operating in a transconductance mode to actuate said actuator means for effecting said seeking and tracking motions of the lens and being switchable to a voltage amplifying mode; and voltage feedback means in the output amplifier means connected to said output connection and to said switchable-amplifier means for supplying a voltage signal from said output connection to said switchable-amplifier means supplying a reference signal to the switchable-amplifier means for limiting its output signal to a predetermined small magnitude for dynamically braking the actuator means for stopping the head carriage radial motions.

11. In apparatus for operating an optical disk drive having a data-storing optical disk, including, in combination:

an objective lens means movably mounted in the optical disk drive for seeking and tracking motions radially with respect to the disk;

servo positioning means in the optical disk drive connected to the objective lens means for supplying a servo drive signal for actuating the objective lens means to move radially of the disk; and output amplifier means electrically interposed between the servo positioning means and the objective lens means for transferring said servo drive signal to the objective lens means for effecting the seeking and tracking motions; said output amplifier means being switchable between transconductance and voltage amplifier modes of operation wherein the radial motions are effected in the transconductance mode in response to said servo drive signal and stopped in the voltage amplifier mode irrespective of said servo drive signal.

12. In the apparatus set forth in claim 11 further including, in combination:

focussing means operatively connected to the objective lens means for focussing the objective lens means to the disk and including error means for detecting and indicating a predetermined focus error; and said error means being connected to the output amplifier means for responding to the indicated predetermined focus error for actuating the output amplifier means to switch from the transconductance mode to the voltage amplifying mode.

13. In the apparatus set forth in claim 11 further including, in combination:

said servo positioning means including velocity means for detecting a current radial velocity of the objective lens means in said seeking and tracking radial motions and supplying a velocity signal indicative of the magnitude of the velocity;

means in the servo positioning means for supplying a velocity threshold signal; and said servo positioning means including error means for comparing the velocity signal with the velocity threshold signal and being connected to the output amplifier means for actuating the output amplifier means to switch from the transconductance mode to the voltage amplifying mode when the velocity signal is greater than the threshold signal.

14. In the apparatus set forth in claim 13 wherein the disk has a plurality of tracks for storing data and are accessible by said objective lens means, further including, in combination:

means in the servo positioning means for effecting a seek operation wherein the objective lens means is moved from a current one of said tracks to a target one of said tracks and for indicating an end of a seek operation as said objective lens means is in juxtaposition to said target one of the tracks;

means in the error means for supplying an end-of-seek velocity threshold signal; and said error means having means responsive to said end of seek indication to compare said indicated velocity signal with said end-of-seek velocity threshold signal for actuating the output amplifier means to switch from the transconductance mode to the voltage amplifying mode.

15. In the apparatus set forth in claim 11 further including, in combination:

said objective lens means including a head carriage relatively movable with respect to the disk in a direction radial of the disk;

said objective lens means further including a fine actuator carrying an objective lens and mounted for relative movement with respect to the disk and the head carriage on the head carriage in said radial direction;

said servo positioning means being connected to the head carriage and to the fine actuator for effecting said seeking and tracking motions and said output amplifier means being electrically interposed between the servo positioning means and the head carriage.

* * * * *